I. D. PERRY.
ATTACHING DEVICE FOR AUTOMOBILE BUMPERS.
APPLICATION FILED AUG. 18, 1921.
1,418,395.
Patented June 6, 1922.
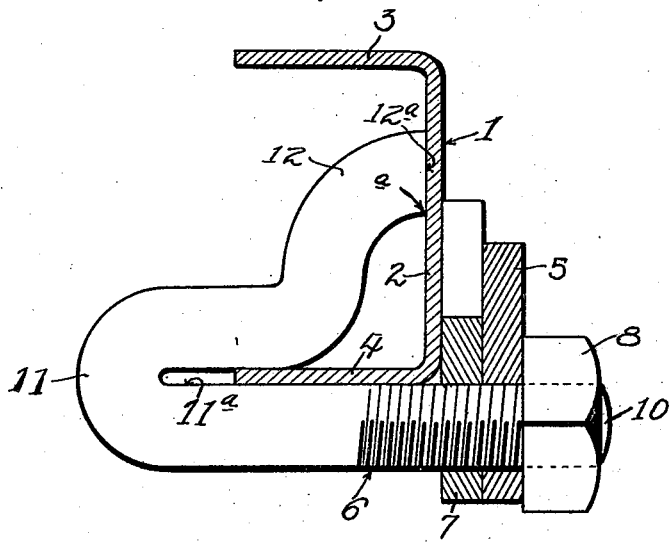
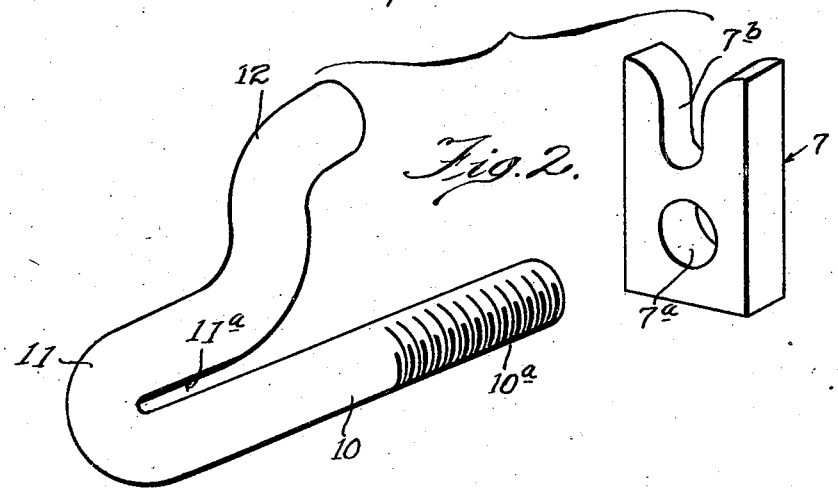
Inventor:
Ira D. Perry.

UNITED STATES PATENT OFFICE.

IRA D. PERRY, OF CHICAGO, ILLINOIS, ASSIGNOR TO THOS. D. BELL, OF CHICAGO, ILLINOIS.

ATTACHING DEVICE FOR AUTOMOBILE BUMPERS.

1,418,395.  Specification of Letters Patent.  Patented June 6, 1922.

Application filed August 18, 1921. Serial No. 493,244.

*To all whom it may concern:*

Be it known that I, IRA D. PERRY, a citizen of the United States, and a resident of Chicago, in the county of Cook and State of Illinois, have invented certain new and useful Improvements in Attaching Devices for Automobile Bumpers, of which the following is a specification.

This invention relates to improvements in attaching devices, especially adapted for the mounting or supporting of bumpers upon the frame members of automobiles, and more particularly of that type including a bolt extending through the supporting or attaching arms of the bumper structure, and provided with a hooked or turned end designed to engage the flange of the vehicle frame member.

I am well aware that the general description of the invention is equally applicable to devices heretofore in common use; namely, the so-called "hook bolt" attachment, and it is therefore the object of the present invention to provide an improved article differing not only in structural features, but involving an improved principle of design calculated to secure a more permanent and rigid connection between the parts.

The improved features embodied in the invention are hereinafter more specifically set forth in the accompanying drawings, in which—

Fig. 1 is a cross-sectional view of a vehicle frame member of the usual channel bar section, with the improved bolt attached thereto, and Fig. 2 is a perspective view of the bolt and bearing plate removed.

The frame or chassis construction universally adopted by automobile manufacturers, includes two longitudinal frame members of the channel form, each member consisting of a vertical web 2, and upper and lower horizontal flanges 3 and 4, respectively, extending inwardly from the outer side of the frame. The bumper, which may be of any suitable construction, is secured to these frame members, a common method being to provide the bumper with arms or bars 5, extending rearwardly and parallel with the forward end portions of the frame members 1, and to clamp the bar 5 to the frame member by means of the attaching devices.

As clearly illustrated, the attaching device of the present invention consists of three parts; namely, a bolt 6, a spacing block or bearing plate 7, and a nut 8, applied to the outer end of the bolt with the addition of a washer, if desired.

Referring to the bolt 6, the same is preferably formed of a round metallic bar of suitable quality and diameter, and shaped in the following manner: A straight shank 10, somewhat greater in length than the combined transverse dimensions of the frame member 1, plate 7, bar 5 and nut 8, is provided throughout its outer or free end portion with screw threads $10^a$. At the inner end of the shank, the bolt is bent backwardly upon itself, forming with the adjacent portion of the shank, a U-shaped portion 11, having a length substantially one-half the length of the shank, and forming between the parts thereof, a narrow slot $11^a$, the width of said slot being substantially equal to the thickness of the flanges 3 and 4 of the frame member 1. The bolt continues beyond the U-shaped or hook portion 11, in the form of an upwardly and longitudinally curved abutment or arm 12 terminating in a flat end face $12^a$ offset laterally from the U-shaped portion 11, and lying in a transverse plane at right angles to and intersecting the shank 10 at a point removed a short distance beyond the central portion, and in a direction toward the outer or free end thereof. The spacer block or plate 7 consists of a rectangular and slightly elongated metallic member, having a hole $7^a$ adjacent one end, and a U-shaped notch $7^b$ extending longitudinally thereof from the opposite end margin.

The manner in which the bolt is applied to the frame member is clearly illustrated in Figure 1, and may be described as follows: The U-shaped portion 11 is hooked over or upon the inner edge of the lower flange 4, the latter passing into the slot $11^a$ a distance determined by the width of the flange and the corresponding dimension of the bolt from the base of the slot and the end face $12^a$, it being obvious that the extent to which the flange may enter the slot is limited by the abutting engagement of said end face 12ª with the vertical web 2 of the frame member. The bolt being thus applied, the shank extends outwardly in contact with the under surface of the flange 4 and parallel therewith, the end of the shank projecting beyond the frame member 1.

The bolt 6 being positioned in this manner, the block 7 is applied to the projecting and threaded end portion of the shank with the notch 7ᵇ facing upwardly, or inclined in such a direction that any projection, such as a rivet head, will be engaged by the notch, thus permitting a flatwise contact between the plate and the surface of the frame member. The bar 5 of the bumper is provided with a suitably disposed hole through which the end of the bolt passes, and the nut 8 is mounted at the extreme end. By tightening the nut, the parts are drawn tightly together; that is, the abutment 12 is forced tightly against the vertical web 2 of the frame member, the flange 4 forced into the slot 11ª, the bearing plate 7 and arm 5 clamped securely against the outer face of the vertical web 2, and the shank forced upwardly against the under-side of the flange 4. The action of parts in the process of tightening the nut is more than merely one of clamping, but involves also the bodily movement of the parts about a fulcrum, as will be understood from the following discussion: Manifestly, the tightening of the nut tends to decrease the length of the shank, and to draw it longitudinally toward the nut. This movement, however, is opposed by the engagement between the end of the abutment 12 and the vertical web, with the result that the longitudinal movement is transformed into a rotative movement in a counter-clockwise direction about the abutting end surface 12ª of the bolt, (the point $a$, to be exact), as a fulcrum. Manifestly, this movement is such as to draw the shank more tightly and upwardly against the flange 4, and the bearing plate 7 against the outer surface of the web, with an accompanying upward thrust. In short, the action is one that tends toward a more secure and permanent connection than a straight clamping force exerted along the shank and acting only to draw the parts together. Clearly the force capable of being applied by tightening the nut is dependent upon the leverage available; that is, the amount that the abutment 12 is offset from the shank, or the distance of the point of abutting contact with the vertical web above the flange 4, this relationship being one of preference largely.

The advantage of the device is readily apparent; namely, that a more positive and permanent connection is made between the vehicle frame and the bumper by reason of the increased leverage available, thus permitting a greater force to be applied in the clamping of the parts, and a greater resistance to vibrating forces tending to loosen the connections.

A further advantage that suggests itself, and particularly over the common type of hook bolt, resides in the provision of the abutment engaging the vertical flange, coupled with the flange-engaging slot. This type of connection is self-supporting in loosed position, whereas in the ordinary hook bolt, which abuts against the lower horizontal flange, the bolt will drop down and away from the flange as soon as the nut is loosed. Thus, if the loosening of the nut should occur unobserved, the improved device will still remain connected to the frame, whereas the ordinary bolt would permit the parts to drop away from the frame. In the improved bolt, it is manifest that if the parts become loosened to a degree sufficient to eliminate the clamping connection, the bolt would theoretically still be supported at two points upon the frame; namely, the point $a$ already referred to, and point $b$; namely, that at which the upper arm of the U-shaped portion 11 engages the upper edge of the flange 4. Now, if a line $a—b$ were drawn, it is clear that so long as said line remained greater than the width of the flange 4, the bolt would remain in supporting position, or, in other words, the length of the shank may be increased considerably before the bolt would drop away from the frame member and become entirely disconnected.

Having described the invention and the advantages thereof, what I claim as new and novel is:

1. An attaching device consisting of a bolt adapted to engage a channel-shaped member, and bent to provide a U-shaped flange engaging slot, and an abutment beyond said U-shaped portion adapted to engage the web of said channel shaped member.

2. An attaching device comprising a bolt having a straight shank, a U-shaped portion forming a flange engaging slot, and an abutment portion extending beyond said U-shaped portion and laterally offset from said slot.

3. An attaching device comprising a bolt having a straight shank, having a U-shaped portion at one end forming a longitudinally extending slot, and an abutment forming an extension of said U-shaped portion and offset transversely from said slot.

4. An attaching device comprising a bolt adapted to be connected to the frame member of a vehicle, said bolt having a straight shank terminating in a U-shaped slot forming portion, adapted to engage the edge of a flange of said frame member, an abutment extending beyond said U-shaped portion toward the free end of said shank, said abutment terminating in transversely offset relation to said U-shaped portion and adapted to abut against the web of said frame member.

5. An attaching device comprising a bolt bent to form a shank, a U-shaped portion forming a flange engaging slot extending parallel to said shank, and an offset portion extending beyond said U-shaped portion, and away from said shank, and terminating in an abutment face transverse to said shank.

6. An attaching device comprising a bolt adapted to be connected to the frame member of a vehicle, said bolt having a straight shank terminating in a U-shaped portion adapted to hook over the edge of a flange of said frame member, and extended toward the free end of said shank to form an abutment terminating in transversely offset relation to said U-shaped portion and adapted to engage the web of said frame member.

7. An attaching device comprising a bolt bent to form a shank, a U-shaped portion forming a slot adapted to engage the marginal portion of a flange, and a free end portion extending beyond said U-shaped portion and laterally offset from said slot, and provided at its end with an abutment face adapted to engage a web angularly disposed to said flange.

In witness whereof, I hereunto subscribe my name this 16th day of August, A. D., 1921.

IRA D. PERRY.